United States Patent [19]
Franklin et al.

[11] Patent Number: 5,577,895
[45] Date of Patent: Nov. 26, 1996

[54] SUBMERGED PUMP UNIT HAVING A VARIABLE LENGTH PIPE ASSEMBLY

[75] Inventors: Charles C. Franklin; Donald P. Kenney, both of McFarland; Brian C. Green, Sun Prairie, all of Wis.

[73] Assignee: FE Petro Inc., McFarland, Wis.

[21] Appl. No.: 396,180

[22] Filed: Feb. 24, 1995

[51] Int. Cl.⁶ .............................. F04B 53/16; F16L 21/00
[52] U.S. Cl. .................... 417/238; 417/361; 417/422; 222/385; 285/131; 285/140; 285/298; 285/382
[58] Field of Search ...................... 417/238, 359, 417/360, 361, 422, 423.3; 222/385; 285/131, 138, 140, 298, 303, 382, 382.7

[56] References Cited

U.S. PATENT DOCUMENTS

| | | | |
|---|---|---|---|
| 1,786,407 | 12/1930 | Humason | 285/298 |
| 1,816,731 | 7/1931 | Hawley, Jr. . | |
| 2,134,311 | 10/1938 | Minor et al. | 285/382 |
| 2,280,087 | 4/1942 | Hollander et al. . | |
| 2,478,701 | 8/1949 | Maginniss . | |
| 2,689,529 | 9/1954 | Wightman . | |
| 2,725,824 | 12/1955 | Arutunoff . | |
| 2,795,397 | 6/1957 | Hull et al. . | |
| 2,829,597 | 4/1958 | Patterson . | |
| 3,037,669 | 6/1962 | Patterson et al. | 417/422 |
| 3,041,977 | 7/1962 | Boyd . | |
| 3,081,915 | 3/1963 | Patterson et al. | 417/422 |
| 3,172,567 | 3/1965 | Deters et al. . | |
| 3,172,572 | 3/1965 | Brown et al. . | |
| 3,197,085 | 7/1965 | Deters et al. . | |
| 3,291,342 | 12/1966 | Mankin | 222/385 |
| 3,716,309 | 2/1973 | Mitchell . | |
| 3,980,112 | 9/1976 | Basham . | |
| 4,400,023 | 8/1983 | Clarke . | |
| 4,603,887 | 8/1986 | Mayfield et al. | 285/298 |
| 4,915,427 | 4/1990 | Zahuranec | 285/382.7 |
| 4,932,257 | 6/1990 | Webb . | |

FOREIGN PATENT DOCUMENTS 1202557  8/1970  United Kingdom .

OTHER PUBLICATIONS

Title: "Swagelok Tube Fittings"—By Swagelok Co.—Oct., 1990—2 pages (cover sheet and one page showing components of Swagelok Tube Fitting).

Primary Examiner—Timothy Thorpe
Assistant Examiner—Roland G. McAndrews, Jr.
Attorney, Agent, or Firm—Marshall, O'Toole, Gerstein, Murray & Borun

[57] ABSTRACT

This disclosure relates to a variable length pipe assembly for connection between a pump-motor unit and a manifold. The assembly is particularly useful in a gasoline dispensing system of a service or filling station. The assembly comprises an inner pair of pipes and an outer pair of pipes. The pipes of the inner pair have telescoped portions and outer ends that are connectable to the pump-motor unit and the manifold. The pipes of the outer pair also have telescoped portions and outer ends that are connectable to the pump-motor unit and the manifold. The inner pair is mounted within the outer pair, a first passage being formed within the inner pair and a second passage being formed by the annular space between the inner pair and the outer pair. A seal is provided between the telescoped portions of the inner pair and another seal is provided between the telescoped portions of the outer pair, and a clamp is provided for securing together the telescoped portions of the outer pair. One of the first and second passages forms a liquid flow conduit between the pump-motor unit and the manifold, and the other of the passages forms a conduit for electric power lines leading to the pump-motor unit.

23 Claims, 8 Drawing Sheets

FIG. 2
FIG. 3
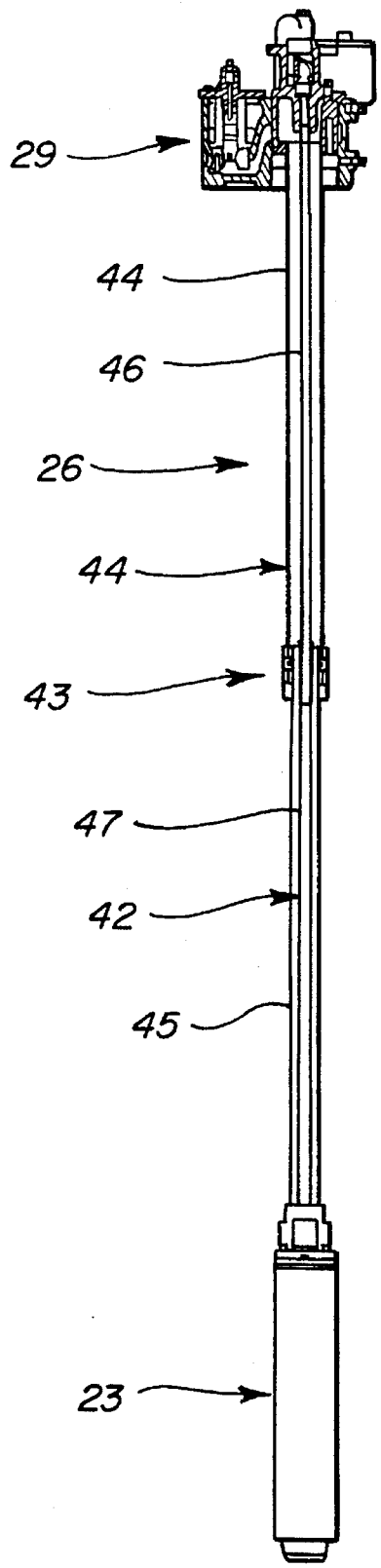
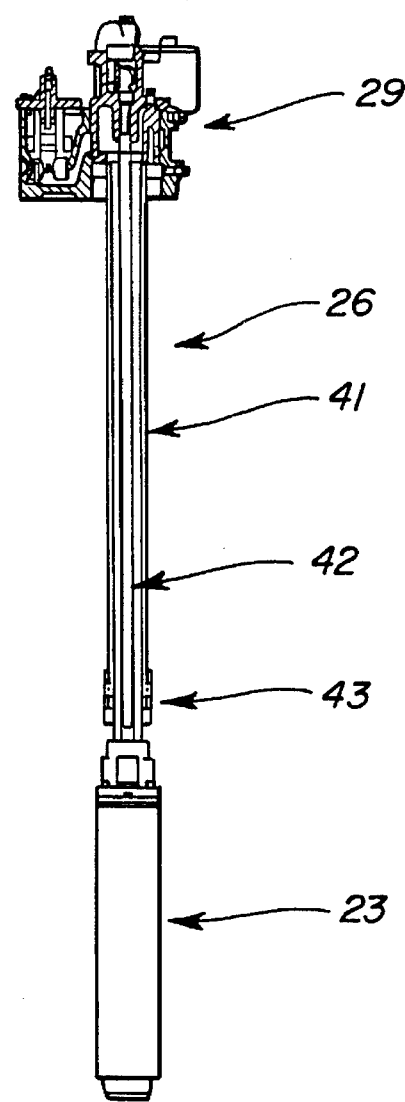

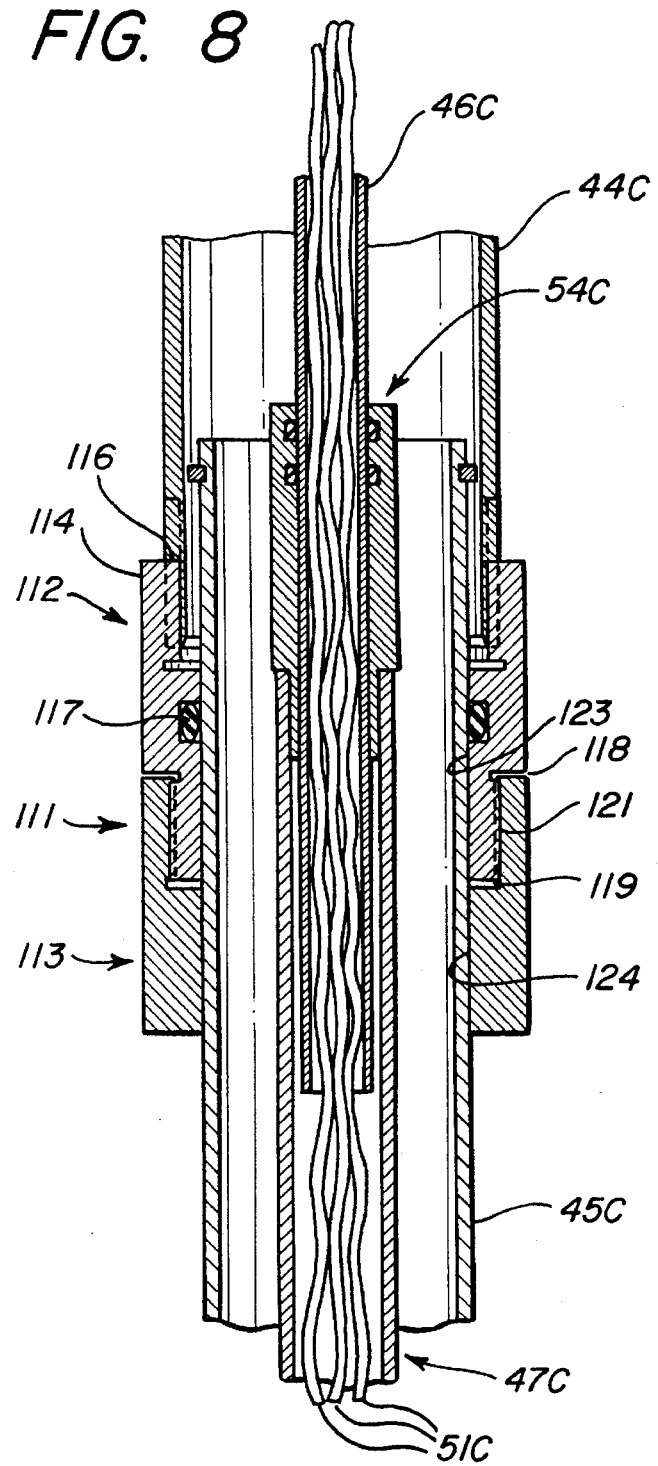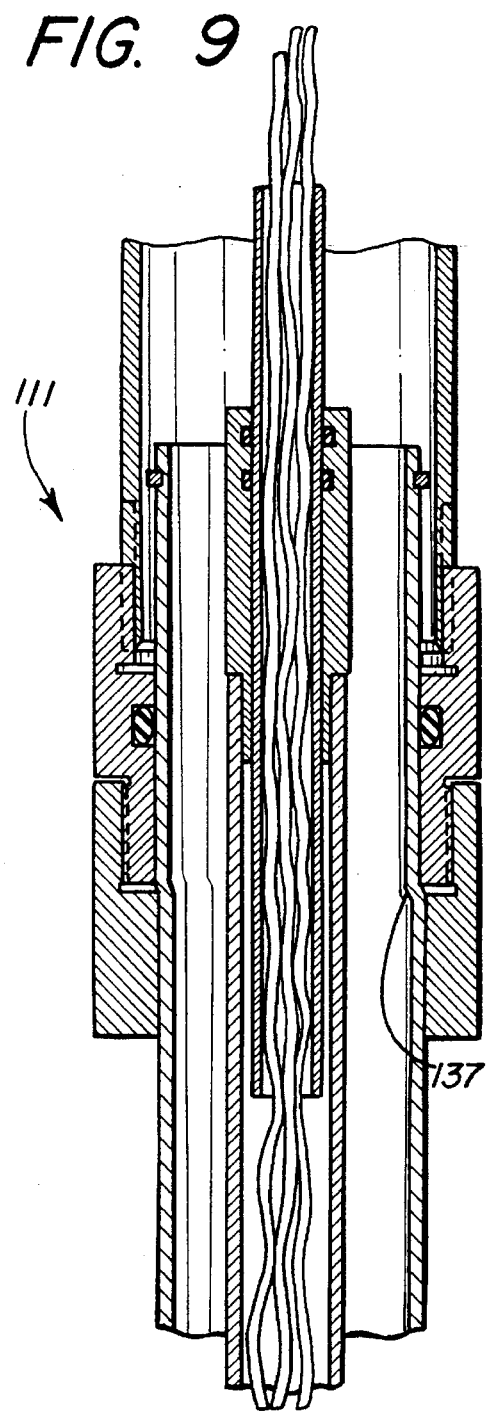

5,577,895

SUBMERGED PUMP UNIT HAVING A VARIABLE LENGTH PIPE ASSEMBLY

FIELD AND BACKGROUND OF THE INVENTION

This invention relates generally to pumping systems, and more specifically to such a system wherein a variable length pipe connects a pump-motor unit to a manifold unit. The manifold unit is connected by pipe to a dispenser located at a distance from the manifold unit. The pump-motor unit connected to a manifold unit is, for example, a submerged turbine pump (STP).

While the invention is described herein in connection with a gasoline pumping system of a service or filling station, it will be recognized that the invention may also have utility in other applications.

Gasoline service or filling stations commonly have underground storage tanks and above ground storage tanks for gasoline and a number of dispensing stands at the ground level. A pump-motor unit is mounted in each tank, and pipes connect each pump-motor unit to a manifold which is a small distance (7" to 70") above top of tank, the manifold being connected to the dispensing stands.

U.S. Pat. No. 3,172,567 and No. 3,197,085 to E. M. Deters et al. describe gasoline dispensing systems of the above nature.

A problem that is frequently encountered in the installation of such a system has to do with the pipes that connect the pump-motor unit to the manifold. It is common practice to provide two concentric pipes that suspend the pump-motor unit from the manifold which is above the tank. The inner of the two pipes house the power cable leading to the electric motor of the unit, and the annular space between the two pipes forms a flow conduit for gasoline flowing from the pump-motor unit to the manifold. The pipes support the pump-motor unit in the tank with the pump intake spaced about twelve centimeters above the bottom of the tank. The problem relates to the length of the pipe assembly necessary to properly locate the pump-motor unit. The length of the pipe assembly is dependent on a number of variables including the inside tank diameter, whether the tank is of steel or fiberglass, the tank bury depth, whether a sump adaptor is used and what its size is, whether a manway is used and its size, the horsepower rating of the pump-motor unit, and the manifold clearance. The information on all of these variables often is not available at the time an STP is ordered, and often the variables are changed during installation. As a consequence, it is often a misguided and dangerous situation to resize and machine the pipe assembly at the installation site, which increases the time and complexity of installation, and also voids approval listings (UL, CSA, etc.) and possibly warranty. This resizing creates a new assembly that has by-passed critical quality checks performed after assembly by the manufacturer.

It is a general object of the present invention to provide a variable length pipe assembly which is readily adjustable to different lengths and therefore avoids the foregoing problems.

SUMMARY OF THE INVENTION

This invention comprises a variable length pipe assembly for connection between a pump-motor unit and a manifold. The assembly comprises an inner pair of telescoping pipes and an outer pair of telescoping pipes. The pipes of the inner pair have overlapping portions and outer ends that are connectable to the pump-motor unit and the manifold. The pipes of the outer pair also have overlapping portions and outer ends that are connectable to the pump-motor unit and the manifold. The inner pair is mounted within the outer pair, a first passage being formed within the inner pair and a second passage being formed between the inner pair and the outer pair. A seal is provided between the overlapping portions of the inner pair and another seal is provided between the overlapping portions of the outer pair, and locking or clamping means is provided for securing together the overlapping portions of the outer pair. One of the first and second passages forms a liquid flow conduit between the pump-motor unit and the manifold, and the other of the passages forms a conduit for electric power lines between the pump-motor unit and the manifold.

BRIEF DESCRIPTION OF THE DRAWINGS

This invention will be better understood from the following detailed description taken in conjunction with the accompanying figures of the drawings, wherein:

FIG. 2 is a view showing apparatus in accordance with the invention;

FIG. 3 is a view of the apparatus of FIG. 2 but showing the parts in different relative positions;

FIG. 8 is another view similar to FIG. 4 but showing still another embodiment of the invention;

FIG. 9 is another view of the embodiment of FIG. 8 but showing different relative positions of the parts;

DETAILED DESCRIPTION OF THE INVENTION

Figure 1:
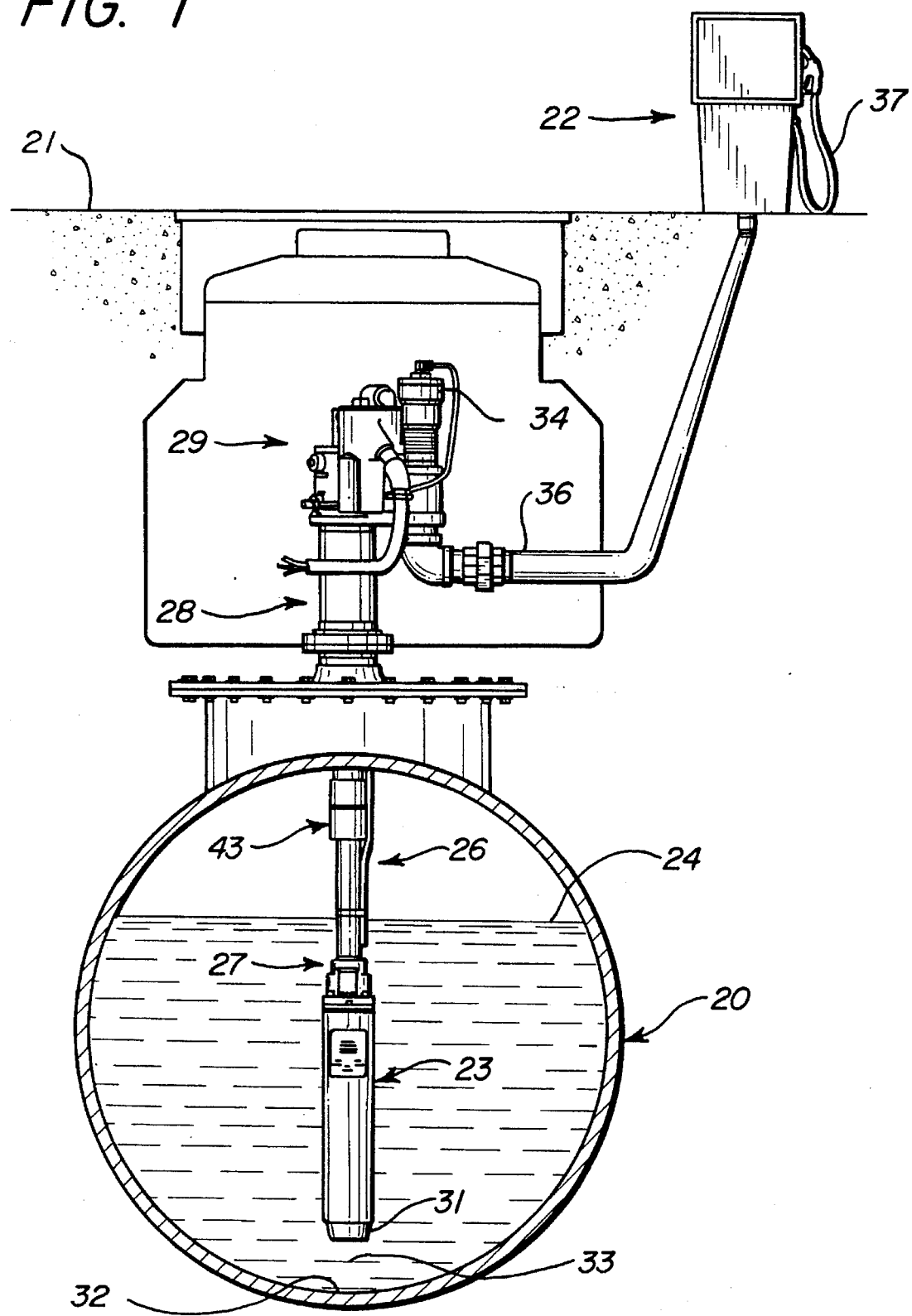
FIG. 1 is a diagrammatic view of a dispensing system including apparatus constructed in accordance with the present invention.

Apparatus in accordance with the invention is particularly suited for use in a gasoline dispensing system of a service or filling station, as illustrated in FIG. 1. Such a system includes a storage tank 20 which is normally buried below the ground or grade level indicated by the reference numeral 21, and at the grade level 21 is located one or more gasoline dispensing stands 22. A pump-motor unit 23 suspended within the tank 20 is operable to pump gasoline 24 out of the tank 20 and to the dispensing stand 22. The pump-motor unit 23 is suspended in the tank 20 by a pipe assembly 26 which has its lower end 27 attached to the pump-motor unit 23 and its upper end connected to a manifold assembly 29. The unit 23 normally includes a connector housing at its upper end, which couples the pipe assembly 26 to the pump-motor. The pump-motor unit 23 has its liquid intake 31 located near the bottom surface 32 of the tank 20 such that a short space 33 exists between the intake 31 and the bottom surface 32.

The riser pipe 28 and the manifold 29 may have conventional constructions and include a leak detector 34. A delivery pipe 36 leads from the manifold 29 to the dispensing stands 22 for delivery of the gasoline through a dispensing hose 37 to a motor vehicle (not shown).

FIGS. 2 and 3 illustrate two positions or orientations of the pump-motor unit 23, the manifold 29 and the pipe assembly 26 in greater detail. The pipe assembly 26 comprises a pair of outer pipes 41, a pair of inner pipes 42, and a mechanism 43 for locking and sealing the pipes together. The outer pipes 41 comprise an upper pipe 44 and a lower pipe 45, the upper end of the lower pipe 45 telescoping into the lower end of the upper pipe 44, and the pair of inner pipes 42 comprise an upper pipe 46 and a lower pipe 47, the lower end of the upper pipe 46 telescoping into the upper end of the lower pipe 47. The lower ends of the two pipes 45 and 47 are secured to the connector housing of the pump-motor unit 23 and the upper ends of the two pipes 44 and 46 are secured to the manifold 29. The interior of the pair of inner pipes 42 forms a conduit for electrical power lines which extend from the pump-motor unit 23, through the manifold 29 and to an electrical control unit (not illustrated), and the annular space formed between the inner pipes 42 and the outer pipes 41 forms a liquid flow conduit or passage for gasoline pumped by the unit 23 upwardly through the manifold 29 to the dispensing stands 22.

The constructions of the pump-motor unit 23, the manifold 29 and the dispensing stands 22 may be conventional and do not form part of the present invention.

Figure 4:
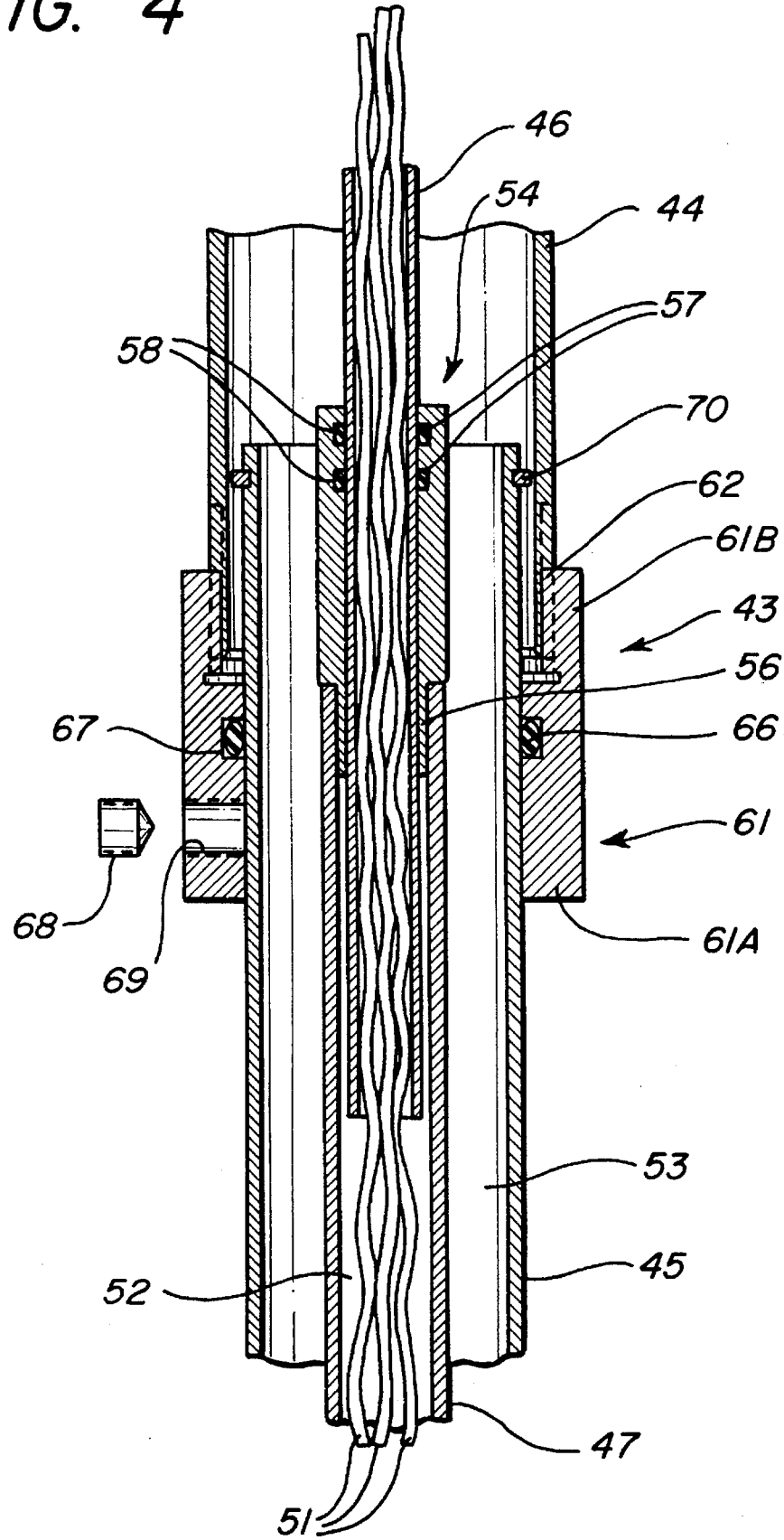
FIG. 4 is a detailed sectional view of a coupling of the apparatus.

FIG. 4 illustrates in more detail the construction of a mechanism 43 constructed in accordance with the invention and the adjacent telescoped portions of the pipes 45 to 47. As mentioned above, the interior space 52 of the inner pipes 46 and 47 form a conduit for electrical power lines 51 which are utilized to power the pump-motor unit 23. As also mentioned above, the annular space between the inner pipes and the outer pipes forms a liquid flow conduit for the gasoline being pumped.

The mechanism 43 illustrated in FIG. 4 comprises a movable or sliding seal connection between the two sets of pipes. The movable seal includes a tubular conduit adaptor 54 which has a reduced diameter lower end portion 56 that extends into the interior of the upper end of the pipe 47, the adaptor 54 being secured to the pipe 47. This securement, as well as the attachment of other parts of the apparatus, may be attained by a variety of methods such as threads, welding, pressing, brazing, etc. A small sliding clearance is provided between the inner diameter of the adaptor 54 and the outer surface of the pipe 46 (which telescopes into the pipe 47) so that the pipe 46 may slide or move vertically (as seen in FIG. 4) relative to the adaptor 54 and the pipe 47, when adjusting the pipes to a desired position as will be described hereinafter. One or more annular grooves 57 are formed in the inner periphery of the adaptor 54, which receive seals 58 (such as O-rings, V-seals, etc.) that provide a leak-proof connection between the pipe 46 and the adaptor 54.

It is important that the annular space or clearance between the pipe 46 and the adaptor 54 be flame-proof in the event an arc or spark occurs in the power lines 51. The sliding clearance is made flame-proof by the seals 57, the narrow space between the adaptor 54 and the pipe 46 and by the relatively long length of the adaptor 54 from the O-rings 58 to the lower end of the adaptor. The long length of the adaptor plus the narrow clearance and the O-rings 58 make the connection between the parts 54 and 46 flame-proof.

The mechanism 43 further comprises a coupling 61 which is secured to the lower end of the pipe 44 such as by a threaded connection indicated by the reference numeral 62. The threaded connection forms a liquid seal by, for example, the application of a pipe thread compound. The pipe 45 has a smaller diameter than the pipe 44 and telescopes into the pipe 44. The coupling 61 has a reduced bore diameter portion 61A at its lower end and a larger bore diameter portion 61B at its upper end which has the threaded connection 62 with the pipe 44. There is a narrow or small sliding clearance between the portion 61A and the outer surface of the pipe 45, this small clearance allowing the pipe 45 to slide vertically within the coupling 61 during assembly of the parts (before final clamping). A seal 66 in a groove 67 formed in the bore of the coupling 61 forms a liquid sealed connection between the coupling 61 and the outer surface of the pipe 45.

To clamp the coupling 61 firmly to the pipe 45, one or more set screws 68 are provided. Radially extending internally threaded holes 69 are formed through the lower part of the coupling 61 below the O-ring 66. When the set screws 68 are threaded into the holes 69 and firmly against the pipe 45, the pipe 45 is clamped to the coupling 61 and they cannot move either lengthwise or circumferentially relative to each other.

When assembling the parts at a construction site, the distance between the lower surface 32 of the storage tank 20 and the manifold is measured. Taking into account the length of the space 33, the desired length of the pipe assembly 26 with pump-motor unit 23 attached is then determined. With the pipes telescoped, the adaptor 54 in place and the coupling 61 in place on the lower end of the outer pipe, the overall length of the pipe assembly is adjusted to the desired length by sliding the pipes 45 and 46 into or out of the pipes 44 and 47 to the necessary distance, and then the set screws 68 are threaded tightly against the pipe 45 in order to clamp the pipe assembly together.

A retaining ring 70 on the outer surface of the pipe 45 adjacent its upper end is preferably provided to prevent the pipe 45 from dropping out of the pipe 44 and the coupling 61 during the length adjustment. The retaining ring 70 may be a conventional split ring which is mounted in an annular groove formed in the outer surface of the pipe 45. The retaining ring 70 may be replaced by other mechanical retainers or by deforming the end of the pipe.

The power lines 51 are threaded through the inner pipes 46 and 47 and electrical connections are made to the electric motor pump unit 23, and the unit 23 is secured to the lower end of the pipe assembly via a connector housing. The electrical connections and the attachment of the pipe assembly to the unit 23 are preferably accomplished prior to the delivery to the installation site. After the length of the pipe assembly has been adjusted and clamped as described above, the unit 23 plus the pipe assembly 26 are lowered into the storage tank. The power lines 51 are clipped and connected to connector leads in the manifold, and then the unit 23 and the pipe assembly are secured to and suspended from the manifold 29. The unit 23 during operation pumps gasoline upwardly through the conduit formed by the annular space 53 as previously described.

FIGS. 2 and 3 illustrate the maximum and minimum lengths of the pipe assembly. Depending upon the desired overall length of the assembly, the overall length may be adjusted to any point between the two lengths illustrated in FIGS. 2 and 3. Further, additional sets of pipe assemblies having different pipe lengths may also be provided for use with storage tanks of greater or lesser depth.

Figure 5:
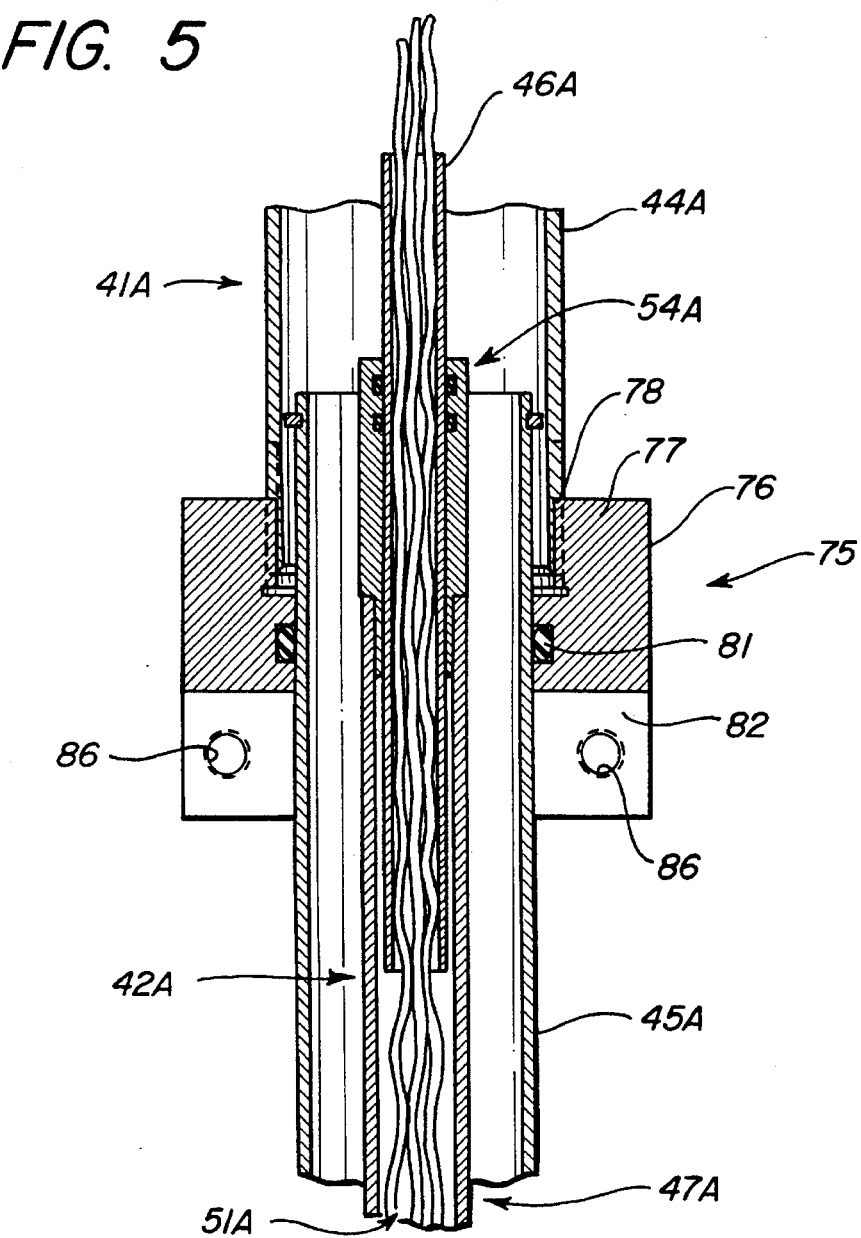
FIG. 5 is a view similar to FIG. 4 but showing another embodiment of the invention.
Figure 6:
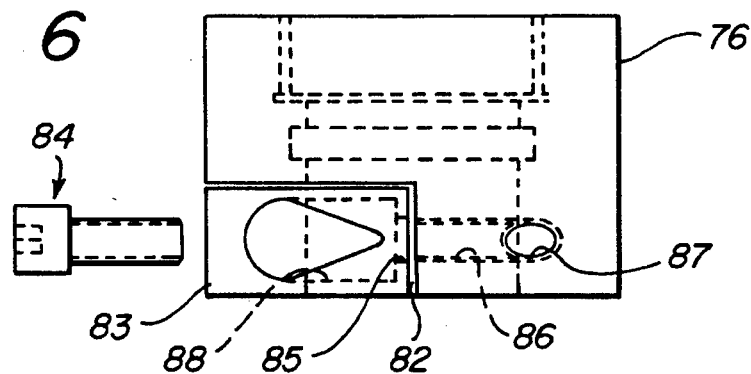
FIG. 6 is a view of a part of the embodiment of FIG. 5.

FIGS. 5 and 6 illustrate another embodiment of the locking and sealing mechanism. The parts shown in FIGS.

5 and 6 which are identical with the corresponding parts in FIG. 4 are given the same reference numerals followed by the letter A. The following description therefore relates primarily to the parts which have a different construction.

The locking and sealing mechanism 75 in FIGS. 5 and 6 includes a coupling 76 having an annular upper part 77 with internal threads that form a sealed threaded connection 78, with the lower end of the outer pipe 44A. The lower portion of the coupling 76 has a reduced diameter bore which has a close sliding fit around the pipe 45A, and a seal is formed by, for example, an O-ring 81 mounted between the coupling 76 and the pipe 45A.

At the lower half of the coupling 75 below the seal 81 is provided a clamp formed by a 180° cutout 82 formed in the lower portion of the coupling, and a 180° clamp segment 83 (FIG. 6) that fits in the cutout 82. The cut out portion 82 and the segment 83 encircle the pipe 45A. Two or more bolts 84 secure the segment 83 to the coupling 76, the bolts 84 being inserted through holes 85 formed in the segment 83 and into threaded holes 86 formed in the coupling 76. The holes 86 appear at the surface of the coupling 76 at the point indicated by the reference numeral 87, and the holes 85 include a counter bore 88 for heads of the bolts 84.

When constructing the pipe assembly, the coupling 76 is secured to the lower end of the pipe 44A, and when the pipes have been adjusted to the desired length, the segment 83 is attached to the coupling 76 by the bolts 84. When the bolts 84 are tightened into the holes 86, the inner periphery of the arcuate segment 83 bears tightly against the outer pipe 45A whereby the pipe 45A is tightly clamped between the segment 83 and the lower portion of the coupling 76, thereby securing the pipes 44A and 45A together.

Instead of forming the cut out 82 and providing a separate segment 83, two or more axially extending slits may be formed through the wall of the coupling 76 from its lower end, to form a split coupling. A plurality of screws arranged generally as shown in FIGS. 5 and 6 would be provided to squeeze the split portions together (and close the slits) in order to clamp the coupling on the pipe 45A.

Figure 7:
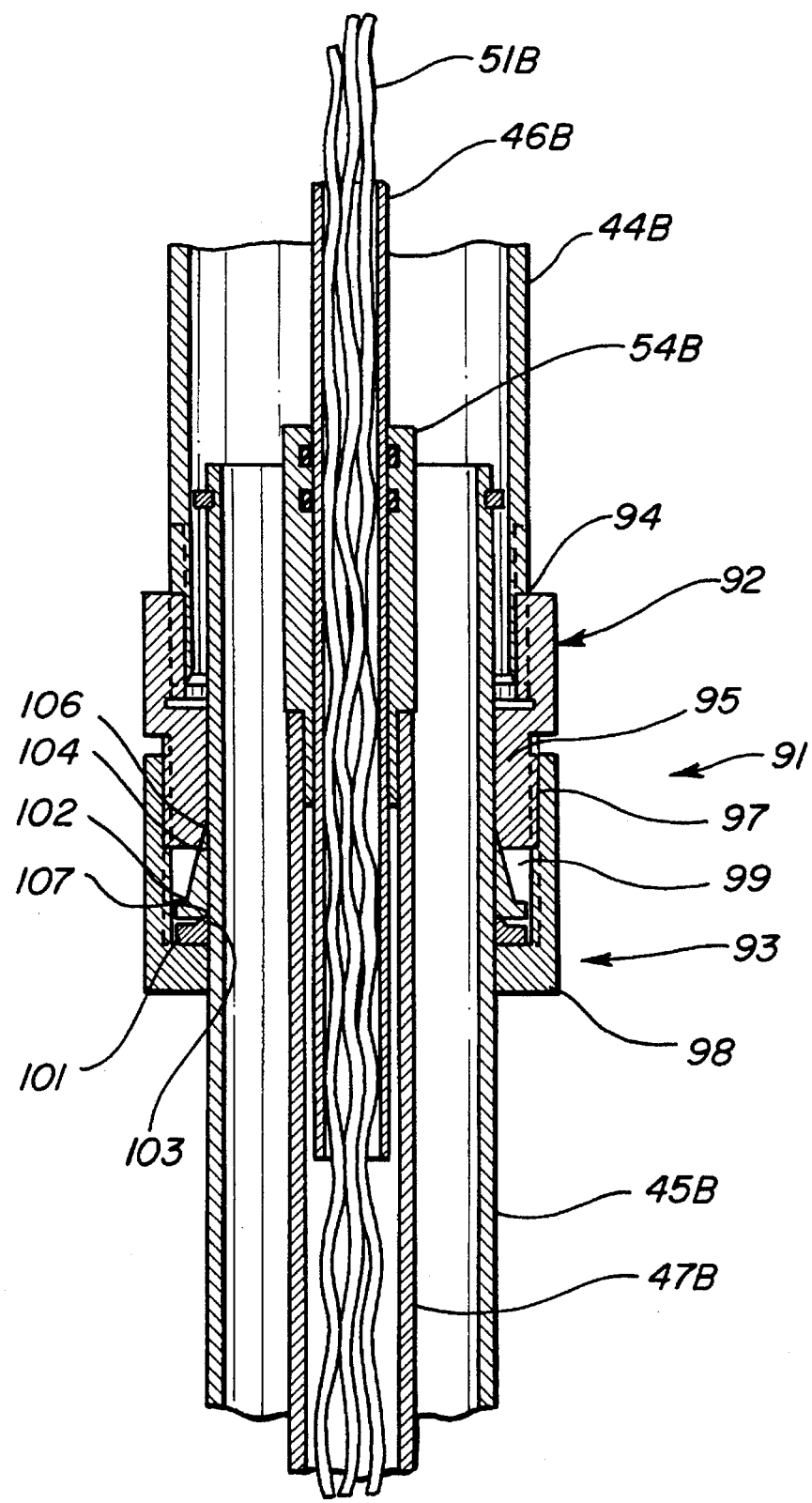
FIG. 7 is a view similar to FIG. 4 but showing another alternative embodiment.

FIG. 7 illustrates another embodiment of the locking and sealing mechanism which includes a compression-type fitting assembly. The locking and sealing mechanism 91 comprises a compression fitting body 92 and a compression fitting nut 93. The body 92 has a sealed threaded connection, indicated by the numeral 94, with the lower end of the pipe 44B at its upper end, and the lower end 95 of the body 92 has reduced inner and outer diameters. The inner diameter of the part 95 fits snugly (but allows sliding) against the outer surface of the pipe 45B and the outer surface of the part 95 has a threaded connection, indicated by the numeral 97, with the upper part of the nut 93. The lower part of the nut 93, indicated by the numeral 98, has a close connection with the outer surface of the pipe 45B. A ferrule cavity 99 is formed between the outer surface of the pipe 45B, the nut 93 and the body 92. At least one ferrule, and in the present example, two ferrules, 101 and 102, are mounted in the cavity 99. The two ferrules 101 and 102 are annular members having tapered extensions 103 and 104, respectively. The taper 104 extends into an annular tapered groove 106 formed between the outer surface of the pipe 45B and the body 92, and the tapered extension 103 extends into an annular tapered recess 107 formed between the pipe 45B and the lower inner edge of the ferrule 102. When the nut 93 is threaded upwardly onto the body 92, the lower end 98 of the nut 93 presses the two ferrules upwardly and both of the ferrules are wedged radially inwardly and upwardly tightly against the pipe 45B and the body 92, thereby forming a firm sealed and clamped connection between the pipes 44B and 45B.

It should be understood in all of the embodiments disclosed herein wherein there is a threaded connection between the upper pipe 44B and a part of the locking and sealing mechanism, that a pipe compound is preferably applied to the threads in order to form a sealed connection through the threads. In the FIG. 7 embodiment, for example, a pipe thread compound is preferably applied at the threaded connection 94. Ferrule 102 is compressed onto pipe 45B and into body 92 to form a seal, and no pipe thread compound is required. In addition, in all of the embodiments disclosed herein, where there is a threaded connection, radial set screws may be provided in addition to the threaded connections to prevent accidental disconnection of the parts.

The embodiment of the invention illustrated in FIGS. 8 through 14 employs an eccentric clamping arrangement for securing the pipes together. With reference to FIG. 8, the locking and sealing mechanism 111 comprises an upper eccentric coupling 112 and a lower eccentric coupling 113. The upper coupling 112 has an upper portion 114 that is fastened by a threaded connection 116 to the lower end of the pipe 44C, and an O-ring seal 117 is provided between the inner surface of the upper coupling 112 and the outer surface of the pipe 45C. The lower end of the coupling 112 is radially recessed at 118 on its outer surface, whereas the upper end of the lower coupling 113 has a recess 119 formed on its inner periphery. The two recessed portions form a threaded connection 121 when the parts are assembled.

Figure 12:
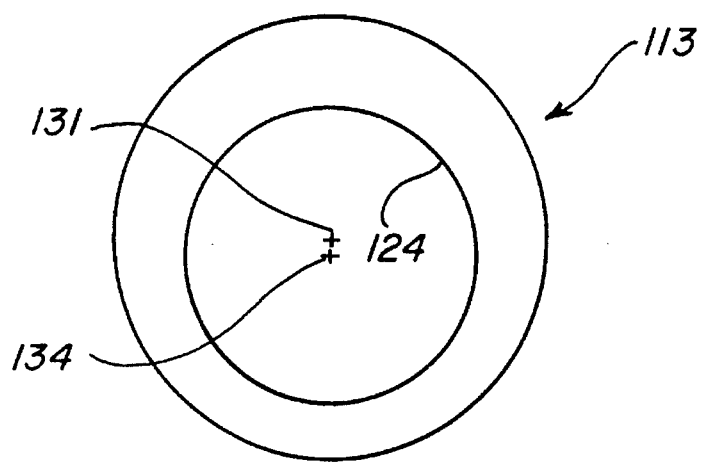
FIGS. 12 through 14 are diagrammatic views illustrating the assembly of the embodiment shown in FIGS. 8 and 9.
Figure 13:
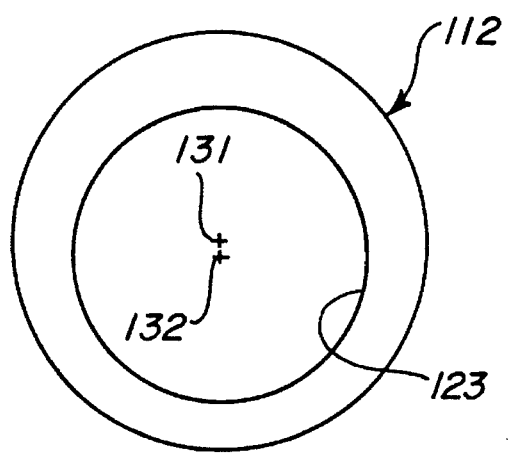
Figure 14:
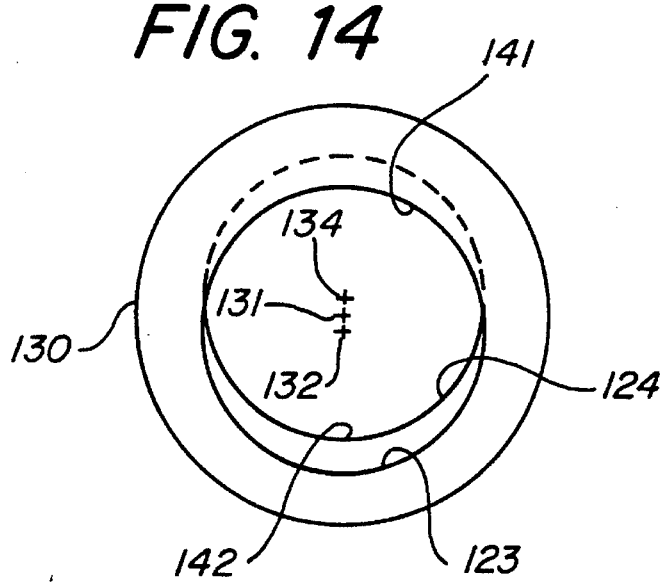

The upper and lower couplings 112 and 113 are provided with circular interior bores 123 and 124 which encircle the outer periphery of the lower pipe 45C. While the outer peripheries of the upper coupling 112 and lower coupling 113 and the threaded connections 116 and 121 are concentric with the pipe 44C and eccentric with pipe 45C, as shown in FIGS. 12 and 13, the bores are offset or eccentric relative to the pipe 44C and concentric with the pipe 45C. With reference to FIG. 13, the reference numeral 131 indicates the center of the outer diameter of the upper coupling 112 whereas the reference numeral 132 indicates the center of the bore 123. Similarly with respect to the lower coupling 113 shown in FIG. 12, the reference numeral 131 indicates the center of the outer surface of the lower coupling 113 and the centers of the pipes 44C and 45C, whereas the reference numeral 134 indicates the center of the bore 124. With reference to FIG. 14, which illustrates the two bores 123 and 124 and their centers, the numeral 130 indicates the outer periphery of the upper and lower couplings 112 and 113. In the positions shown in FIG. 14, the two couplings are turned to the position where the centers 132 and 134 are on diametrically opposite sides of the center 131 and consequently the bores 123 and 124 are offset on opposite sides of the center 131. If one coupling were turned 180° relative to the other of the two couplings from the position of FIG. 14, the two centers 132 and 134 would be coincident and the bores 123 and 124 would line up.

Relative to the center 131, the side 141 of the bore 123 forms an inwardly extending lobe or eccentric portion of the coupling 112, and the side 142 of the bore 124 similarly forms a lobe or eccentric portion of the coupling 113.

It should be understood that the amount of the offset as illustrated in FIGS. 8, 9 and 14 is greatly exaggerated in order to illustrate the operation and structure of the invention. The amount of the offset may actually be quite small and the distance from the center 131 to each of the centers 132 and 134 may be, for example, 0.025 inch. The total distance or offset between the points 132 and 134 would, of course, be twice that amount.

The steps in the assembly of the mechanism illustrated in FIGS. 8 through 14 may have different sequences, and the following is an example of a method of assembly. The upper and lower couplings 112 and 113 are threaded together as indicated at 121 and are positioned such that the center points 132 and 134 are coincident. In this position, the bores 123 and 124 are also lined up. The two couplings 112 and 113 are then slipped over the lower pipe 45C and the coupling 112 is threaded onto the lower end of the pipe 44C. As the upper coupling 112 is threaded onto the pipe, the bores 123 and 124 swing around the center point 131 and carry the lower pipe 45C with them, but there is sufficient clearance between the upper end of the pipe 45C and the pipe 44C that this swinging movement does not create a problem. The foregoing steps are preferably carried out prior to the delivery of the apparatus to the installation site, such as by the manufacturer.

After the lower pipe and the upper pipe are adjusted to produce the desired overall length of the pipe assembly, the lower coupling 113 is turned 180° relative to the upper coupling 112 to produce the offset relation of the bores 123 and 124 shown in FIG. 14. FIG. 9 also illustrates the two coupling parts in the offset or clamping position, and the eccentric bores 123 and 124 cause the pipe to be deformed as indicated at 137 in FIG. 9. Consequently, the offset bores tightly clamp the pipe 45C between the two coupling parts 112 and 113 because the offset 137 cannot move upwardly relative to the lower end of the upper coupling 112 and cannot move downwardly relative to the lower coupling 113. The deformation also prevents the pipe 45C from rotating relative to the pipe 44C.

While the eccentric upper and lower couplings 112 and 113, in effect, produce two inwardly extending lobes or eccentric cam-like surfaces, it should be understood that a different number of lobes may be provided. For example, if three lobes were provided, the two couplings would be turned 120° to the clamping position.

Figure 10:
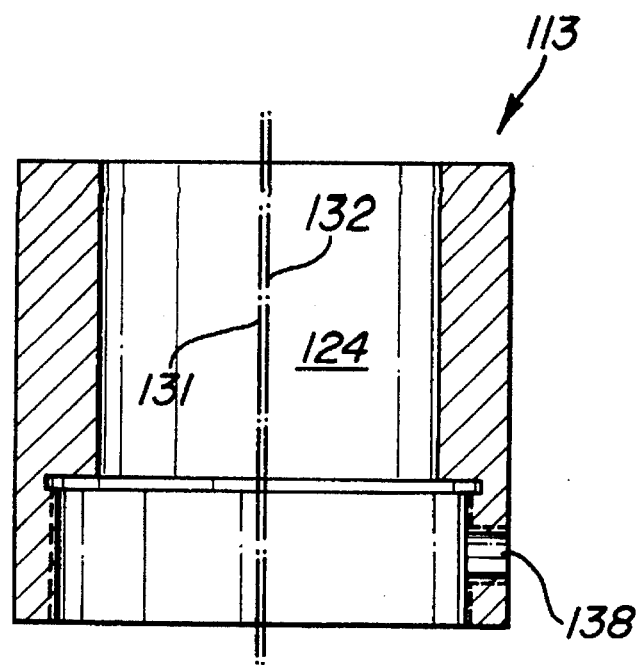
FIGS. 10 and 11 are views of parts of the embodiment shown in FIGS. 8 and 9.
Figure 11:
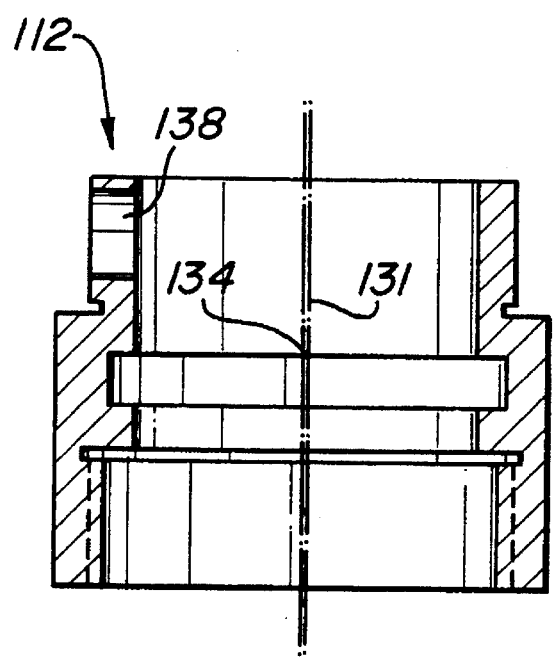

With reference to FIGS. 10 and 11 which show the couplings 112 and 113, holes 138 for set screws, and set screws may be provided to further secure the couplings to the pipe 45C.

It will be apparent from the foregoing that a novel and useful invention has been provided. A single assembly of pipes and a locking and sealing mechanism may be provided and meet a variety of depth requirements without the need for cutting pipes to length or otherwise machining the pipes at the job site. While a number of designs of clamping and sealing mechanisms are illustrated and described, it will be apparent that the invention is not limited to the specific structures disclosed and that other clamping and sealing mechanisms may be provided. Further, a variable length pipe assembly in accordance with the invention may have more than two pairs of telescoping pipes and more than one clamping and sealing mechanism, and thus have a longer range of variation in the overall length. while the foregoing description and the claims refer to pipes, it should be understood that this term is used in a broad sense and includes tubes, conduits, etc.

What is claimed is:

1. A variable length pipe assembly for connection between a pump-motor unit and a manifold unit, said assembly comprising:

a) an inner pair of first and second pipes and an outer pair of third and fourth pipes;

b) said first and second pipes having telescoped portions and outer ends;

c) said third and fourth pipes having telescoped portions and outer ends;

d) said inner pair being mounted within and spaced from said outer pair to form a first conduit between said inner pair and said outer pair, said inner pair forming a second conduit therein;

e) said outer ends of said first and third pipes being connectable to said pump-motor unit and said outer ends of said second and fourth pipes being connectable to said manifold unit; and f) a locking and sealing mechanism comprising means for sealing said first conduit from said second conduit, and means for clamping together said telescoped portions of said pipes of one of said inner pair and said outer pair.

2. Apparatus as set forth in claim 1, wherein said means for sealing forms a liquid flow seal and a flame prevention seal between said first and second pipes.

3. Apparatus as set forth in claim 1, wherein said means for sealing forms a slip fit telescoping connection between said first and second pipes.

4. Apparatus as set forth in claim 1, wherein said first conduit forms a passage for power cables to said pump-motor unit, and said second conduit forms a flow passage for liquid pumped by said pump-motor unit.

5. Apparatus as set forth in claim 1, wherein said third and fourth pipes of said outer pair are clamped, and said means for clamping together said telescoped portions of said third and fourth pipes is movable from a release condition to a clamping condition, said means for clamping forming when in said release condition a sliding connection between said third and fourth pipes and forming when in said clamping condition a secured connection between said third and fourth pipes.

6. Apparatus as set forth in claim 5, wherein said means for securing comprises a coupling which is secured to one of said third and fourth pipes and at least one set screw connecting said coupling to the other of said third and fourth pipes.

7. Apparatus as set forth in claim 5, wherein said means for securing comprises a clamp which is secured to one of said third and fourth pipes and a collar for securing said clamp to the other of said third and fourth pipes.

8. Apparatus as set forth in claim 5, wherein said means for securing comprises a compression fitting assembly coupled between said third and fourth pipes.

9. Apparatus as set forth in claim 5, wherein said means for securing comprises a first coupling secured to one of said first and second pipes and having a first bore which receives the other of said first and second pipes, a second coupling rotatably attached to said first coupling and having a second bore which receives said other of said first and second pipes, and at least one of said first and second bores has a portion which is eccentric relative to said other of said pipes, whereby when couplings are rotated relative to each other, said eccentric portion clamps said other of said pipes.

10. Apparatus as set forth in claim 9, wherein both of said first and second bores have portions which are eccentric.

11. Apparatus as set forth in claim 9, wherein said one of said first and second bores has two portions which are eccentric.

12. Apparatus comprising a pump-motor unit, a manifold displaced from said unit, and a variable length pipe assembly connecting said pump-motor unit with said manifold, said assembly comprising:

a) an inner pair of first and second pipes and an outer pair of third and fourth pipes;

b) said first and second pipes having telescoped portions and outer ends;

c) said third and fourth pipes having telescoped portions and outer ends;

d) said inner pair being mounted within and spaced from said outer pair to form a first conduit between said inner pair and said outer pair, said inner pair forming a second conduit therein;

e) said outer ends of said first and third pipes being connected to said pump-motor unit and said outer ends of said second and fourth pipes being connected to said manifold; and f) a locking and sealing mechanism comprising first seal means between said telescoped portions of said first and second pipes, second seal means between said telescoped portions of said third and fourth pipes, and means for clamping together said telescoped portions of said third and fourth pipes.

13. Apparatus as set forth in claim 12, wherein said first seal means forms a liquid flow seal and a flame prevention seal between said first and second pipes.

14. Apparatus as set forth in claim 12, wherein said first seal means forms a slip fit telescoping connection between said first and second pipes.

15. Apparatus as set forth in claim 12, wherein said first conduit forms a passage for power cables extending between said manifold and said pump-motor unit, and said second conduit forms a flow passage for liquid pumped by said pump-motor unit to said manifold.

16. Apparatus as set forth in claim 12, wherein said means for clamping together said telescoped portions of said third and fourth pipes is movable from a release condition to a clamping condition, said means for clamping forming when in said release condition a sliding connection between said third and fourth pipes and forming when in said clamping condition a secured connection between said third and fourth pipes.

17. Apparatus as set forth in claim 16, wherein said means for securing comprises a coupling which is secured to one of said third and fourth pipes and at least one set screw connecting said coupling to the other of said third and fourth pipes.

18. Apparatus as set forth in claim 16, wherein said means for securing comprises a clamp which is secured to one of said third and fourth pipes and a collar for securing said clamp to the other of said third and fourth pipes.

19. Apparatus as set forth in claim 16, wherein said means for securing comprises a compression fitting assembly coupled between said third and fourth pipes.

20. Apparatus as set forth in claim 16, wherein said means for securing comprises a first coupling secured to one of said first and second pipes and having a first bore which receives the other of said first and second pipes, a second coupling rotatably attached to said first coupling and having a second bore which receives said other of said first and second pipes, and at least one of said first and second bores has a portion which is eccentric relative to said other of said pipes, whereby when couplings are rotated relative to each other, said eccentric portion clamps said other of said pipes.

21. Apparatus as set forth in claim 20, wherein said both of said first and second bores have portions which are eccentric.

22. Apparatus as set forth in claim 20, wherein said one of said first and second bores has two portions which are eccentric.

23. Apparatus comprising a storage tank for a liquid such as gasoline, said storage tank having a tank top, a manifold at a distance above tank top, a pump-motor unit, a power cable extending from said manifold to said pump-motor unit, and a variable length pipe assembly connecting said pump-motor unit with said manifold and suspending said pump-motor unit in said storage tank, said assembly comprising:

a) an inner pair of first and second pipes and an outer pair of third and fourth pipes;

b) said first and second pipes having telescoped portions and outer ends;

c) said third and fourth pipes having telescoped portions and outer ends;

d) said inner pair being mounted within and spaced from said outer pair to form a first conduit between said inner pair and said outer pair, said inner pair forming a second conduit therein;

e) said outer ends of said first and third pipes being connected to said pump-motor unit and said outer ends of said second and fourth pipes being connected to said header; and f) a locking and sealing mechanism comprising first seal means between said telescoped portions of said first and second pipes, second seal means between said telescoped portions of said third and fourth pipes, and means for clamping together said telescoped portions of said third and fourth pipes, said first conduit forming a flow passage for liquid from said unit, and said second conduit having said power cable mounted therein.

* * * * *